US009295229B2

(12) United States Patent
Mills

(10) Patent No.: US 9,295,229 B2
(45) Date of Patent: Mar. 29, 2016

(54) HORN WRAP

(71) Applicant: Brett W. Mills, Redmond, OR (US)

(72) Inventor: Brett W. Mills, Redmond, OR (US)

(*) Notice: Subject to any disclaimer, the term of this patent is extended or adjusted under 35 U.S.C. 154(b) by 70 days.

(21) Appl. No.: 14/088,212

(22) Filed: Nov. 22, 2013

(65) Prior Publication Data
US 2015/0144073 A1 May 28, 2015

(51) Int. Cl.
A01K 13/00 (2006.01)

(52) U.S. Cl.
CPC .................... A01K 13/006 (2013.01)

(58) Field of Classification Search
CPC ... A01K 13/006; A01K 17/00; Y10T 24/2708
USPC ........................................ 119/851
See application file for complete search history.

(56) References Cited

U.S. PATENT DOCUMENTS

| 3,052,216 | A | | 9/1962 | Blunt et al. | |
|---|---|---|---|---|---|
| 3,834,354 | A | * | 9/1974 | Kelton | 119/851 |
| 4,233,942 | A | * | 11/1980 | Williams | 119/814 |
| 5,535,707 | A | | 7/1996 | Siddoway | |
| 7,386,972 | B2 | | 6/2008 | Wilson et al. | |
| 7,665,282 | B2 | | 2/2010 | Wilson et al. | |
| 2010/0229509 | A1 | | 9/2010 | Mills | |
| 2011/0036306 | A1 | * | 2/2011 | Chao | 119/850 |

* cited by examiner

Primary Examiner — Monica Williams
Assistant Examiner — Jessica Wong
(74) Attorney, Agent, or Firm — Leber Patent Law P.C.

(57) ABSTRACT

Horn wraps are disclosed for protecting the horns and head of a steer, e.g., during team roping. The horn wraps can be easily and safely applied to a steer, can be left on the steer for an extended period of time, and have a relatively long use life due to the replaceability and interchangeability of the parts of the horn wrap. In some implementations, the horn wraps are attached to the steer using an attachment system that includes replaceable closures having hook and loop fasteners.

14 Claims, 5 Drawing Sheets

HORN WRAP

BACKGROUND

Protective horn wraps are often used in the rodeo sport of team roping, to protect a steer's horns, ears and head from damage as a result of the tightening of the rope or lariat around the horns.

Horn wraps generally include a pair of separate, side head pads that are connected to each other when in use by a strap system. The strap system includes a relatively short strap with a buckle, extending from one of the pads, and a much longer strap extending from the other pad. The long strap is configured to be looped around the bottom of the steer's neck and around the steer's horns (e.g., in a figure eight) and then fastened to the buckle on the other strap. An example of this type of horn wrap is shown in U.S. Pat. No. 5,535,707.

Typically, to apply a conventional horn wrap to a steer it is necessary to place each of the pads over one of the steer's horns, and then fasten the strap system around the steer's head, all while the steer is fidgeting and swinging its head back and forth.

Because the two pads are attached only by the single long strap, if that strap fails or becomes unfastened one or both pads will tend to come off of the steer. The steer may also trip over or become entangled in the long strap, or the strap may get caught on stationary objects. For this reason, and because this type of horn wrap is uncomfortable to the steer, such horn wraps are typically removed from the steer after each roping event or practice.

SUMMARY

The present invention features horn wraps that can be easily and safely applied to a steer, can be left on the steer for an extended period of time, and have a relatively long use life due to the replaceability and interchangeability of the parts of the horn wrap.

In one aspect, the invention features a horn wrap that includes a pair of protective elements, configured to be positioned on opposite sides of a steer's head and each having an opening configured to receive one of the steer's horns, and an attachment system configured to join the protective elements together around the steer's head, the attachment system comprising hook and loop fasteners.

Some implementations include one or more of the following features.

The hook and loop fasteners may be carried by a pair of releasable closures, each releasable closure extending between the protective elements and being configured to draw the protective elements together around the steer's head. Each of the releasable closures may comprise an elongated strap that is folded in thirds when in use. The strap may include a first portion that has fastener elements on both of its broad surfaces, and be configured such that when the releasable closure is folded into thirds the first portion is captured between second and third portions of the strap that carry fastener elements that engage the fastener elements on the first portion.

The horn wrap may further include an elastomeric strap attached to and extending between the protective elements, the elastomeric strap being positioned on the protective elements so that it will extend across the throat of the steer in use. The elastomeric strap may comprise a continuous loop of flat elastomeric material, e.g., it may comprise a Dally rubber.

In some cases, each protective element comprises a side portion which protects the steer's horn and defines the opening, and a rear portion, which protects the back of the steer's head and neck, and one of the releasable closures is configured to draw together the side portions, and the other releasable closure is configured to draw together the rear portions.

In another aspect, the invention features a horn wrap that includes (a) a pair of protective elements, configured to be positioned on opposite sides of a steer's head and each comprising a side portion which protects the steer's horn and defines an opening configured to receive the horn, and a rear portion, which protects the back of the steer's head and neck; and (b) an attachment system configured to join the protective elements together around the steer's head, the attachment system comprising a front releasable closure configured to draw together the side portions, and a rear releasable closure configured to draw together the rear portions.

Some implementations include any one or more of the features discussed herein, including the features mentioned above in connection with the first aspect of the invention.

The invention also features methods of using the horn wraps disclosed herein. In one aspect, the invention features a method comprising (a) placing a first protective element of a horn wrap over one horn of a steer; (b) placing a second protective element of the horn wrap over the other horn of the steer; and (c) fastening a pair of releasable closures to secure the two protective elements together around the steer's head.

In some cases, each of the releasable closures is partially fastened to one of the protective elements prior to placing the protective element over the steer's horn. The method may further comprise positioning an elastomeric strap extending between the protective elements adjacent the throat of the steer.

The term "steer," as used herein, refers to all horned roping cattle and is not gender-specific.

DETAILED DESCRIPTION

Figure 1:
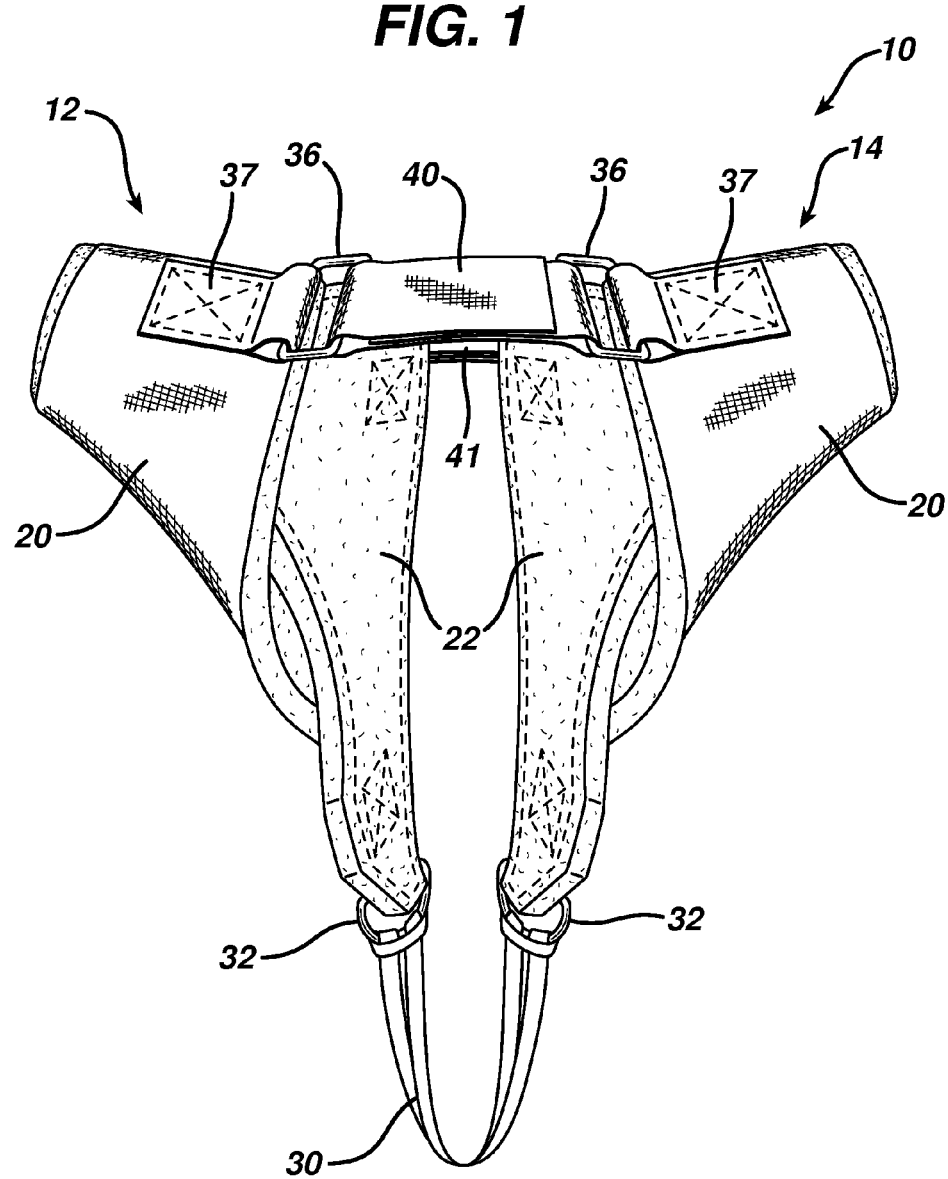
FIG. 1 is a front view of a horn wrap according to one embodiment.
Figure 2:
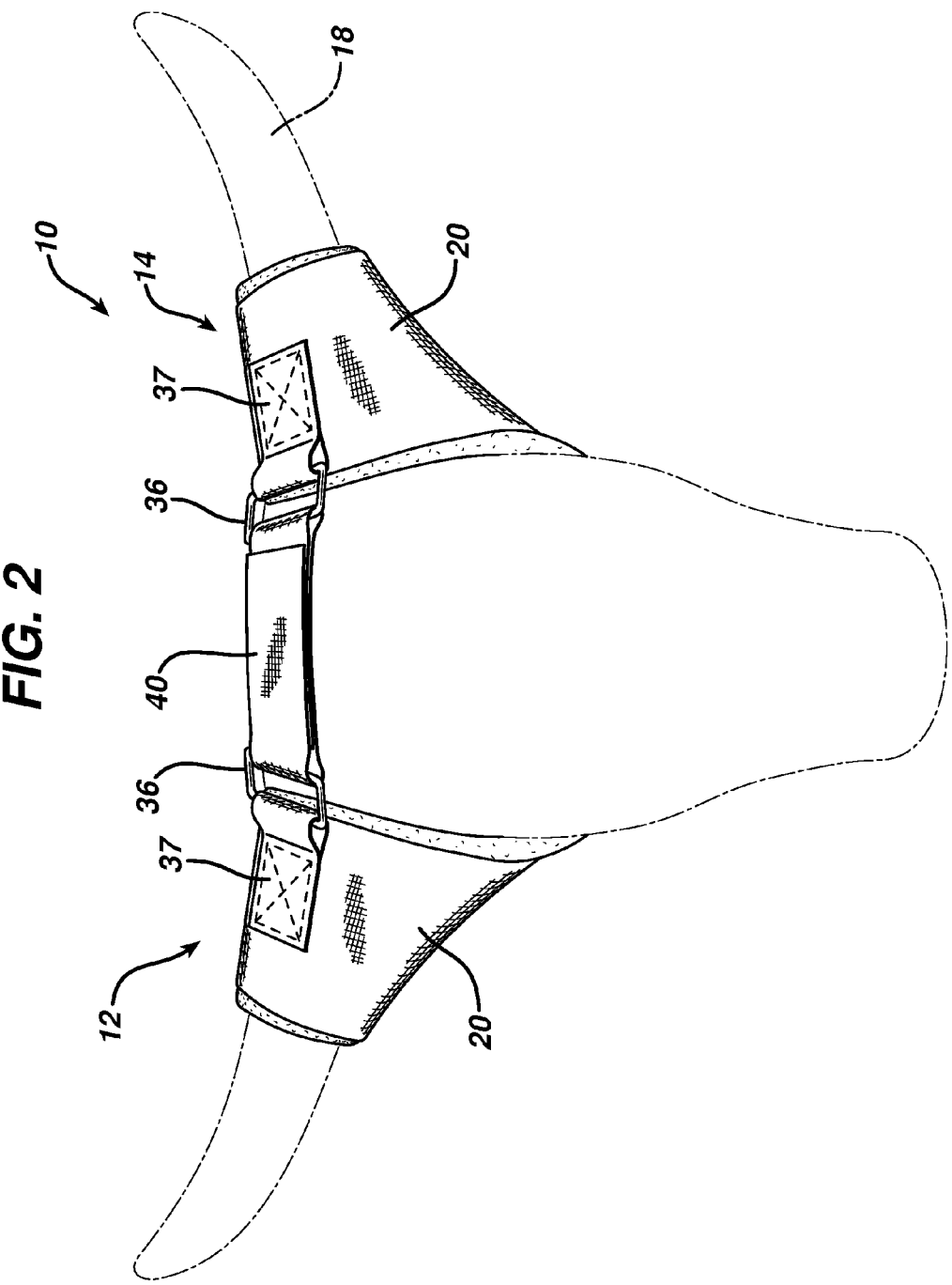
FIG. 2 is a front view showing the horn wrap on a steer.
Figure 3:
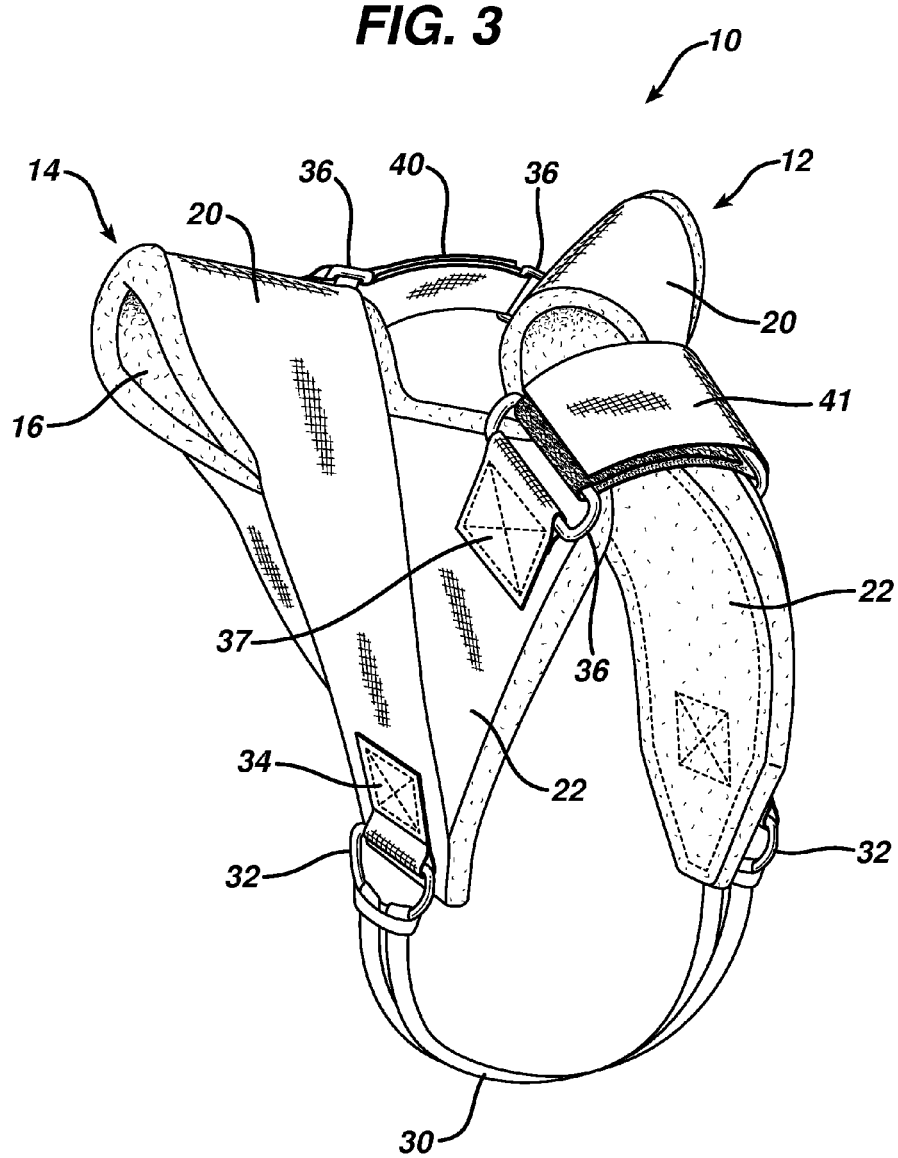
FIG. 3 is a rear perspective view of the horn wrap.
Figure 4:
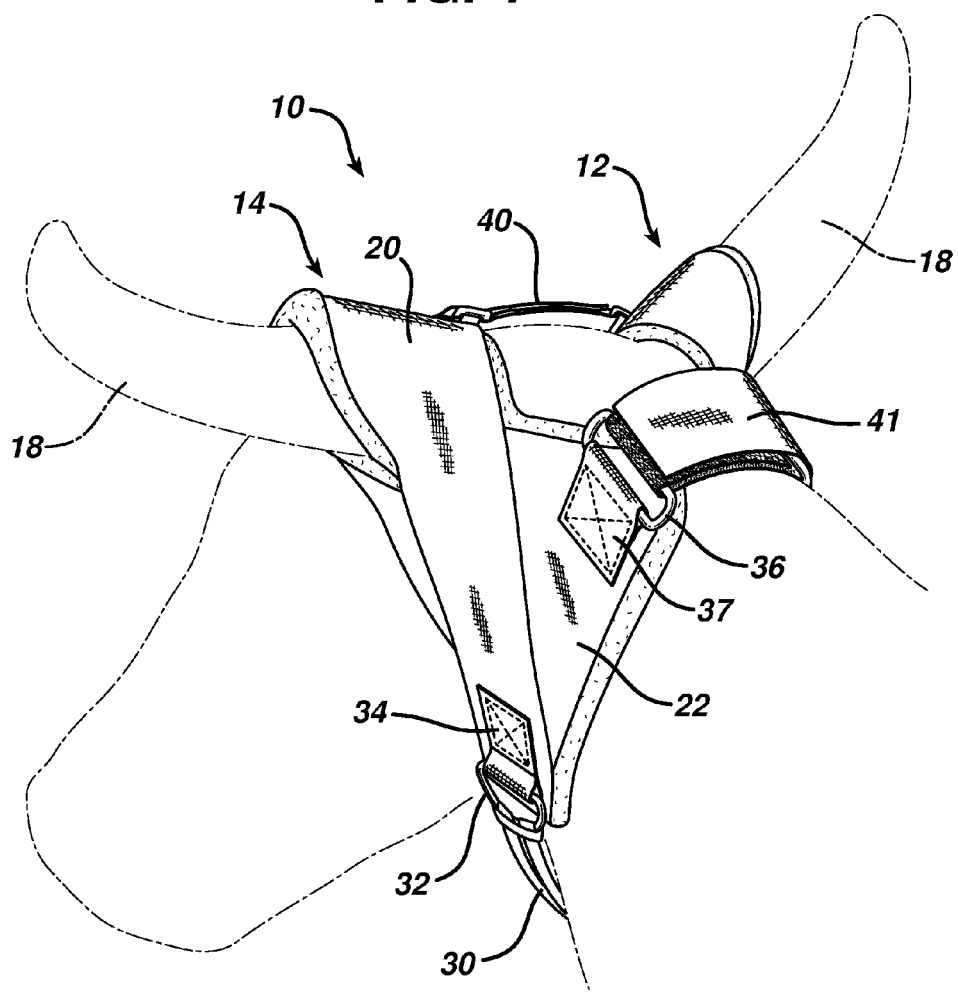
FIG. 4 is a rear perspective view showing the horn wrap on a steer.

FIGS. 1-4 show a horn wrap 10 that includes a pair of protective elements 12, 14, which are mirror images of each other and which are configured to be positioned on a steer's head. Each of the protective elements includes a horn opening 16 (FIG. 3), through which the steer's horn 18 extends during use, as shown in FIGS. 2 and 4. Each of the protective elements is comprised of a side portion 20, which protects the steer's horn and defines the opening 16, and a rear portion 22, which protects the back of the steer's head and neck, as shown in FIGS. 2 and 4, and which helps to hold the protective element in position. The protective elements may be made, for example, of an inner padding material, such as needled felt, foam or the like, covered by a durable outer layer such as a ripstop or ballistic material, as is well known.

The protective elements 12, 14, are secured together by three separate attachment devices, each of which is readily removable and replaceable, as will be discussed below. The use of three attachment devices provides redundancy—should one of the devices fail there will still be two remaining to retain the horn wrap on the steer's head. The horn wrap is configured so that only one of the devices need be fastened in order to put the horn wrap on a steer's head, allowing easy application of the horn wrap to a restless animal.

The three attachment devices are: a front releasable closure 40, a rear releasable closure 41, and an elastomeric strap 30. The releasable closures will be discussed in further detail below. These closures can be easily replaced should they become worn or if a different color or design is desired. The closures are also easy to open and close, making it easy to apply the horn wrap to a steer's head.

The elastomeric strap is positioned on the protective members so that it will extend across the throat of the steer during use (FIG. 4), generally at the lowest edge of the rear portions 22. The elastomeric strap 30 may be, for example, a dally rubber (also known as a dally wrap). A Dally rubber is a continuous circle of flat rubber that is used by ropers to protect their saddle horns and to prevent the rope from slipping around the saddle horn. Accordingly, replacements are readily available. However, other loops of elastomeric material may be used. Preferably, the elastomeric strap is attached to the protective members by girth hitching the strap through a pair of D-rings 32 that are secured to the protective members. This method of attaching the strap allows for quick and easy replacement should the strap break or appear worn. The D-rings may be secured to the protective members by a loop of webbing 34 that is stitched to each protective member (FIG. 3). In addition to being readily replaceable and facilitating easy application of the horn wrap to the steer, the elastomeric strap enhances safety by breaking away if caught on a stationary object.

The releasable closures are preferably attached to the protective members using rectangular rings 36. The rectangular rings are attached to the protective members by loops of webbing 37 that are stitched to the protective members. The rings 36 are positioned so that the upper releasable closure 40 extends across the steer's head approximately level with the horns (FIG. 2), aligned with the center top of the horn opening 16, and the rear releasable closure 41 extends across the upper portion of the steer's neck several inches behind the horns (FIG. 4), aligned with the furthest rear parallel edges of rear portions 22. As a result, the front releasable closure 40 holds the side portions 20 together while the rear releasable closure 41 holds the rear portions 22 together, snugly and comfortably securing the horn wrap to the steer's head. This secure attachment prevents the horn wrap from chafing against the steer's hide, enhancing comfort and in some cases allowing the horn wrap to be worn for an extended period of time. The use of two relatively small and narrow replaceable closures, rather than several wraps of a heavy webbing strap—e.g., as disclosed in U.S. Pat. No. 5,535,707—makes the horn wrap cooler to wear, enhancing comfort of the steer during hot weather.

Figure 5:
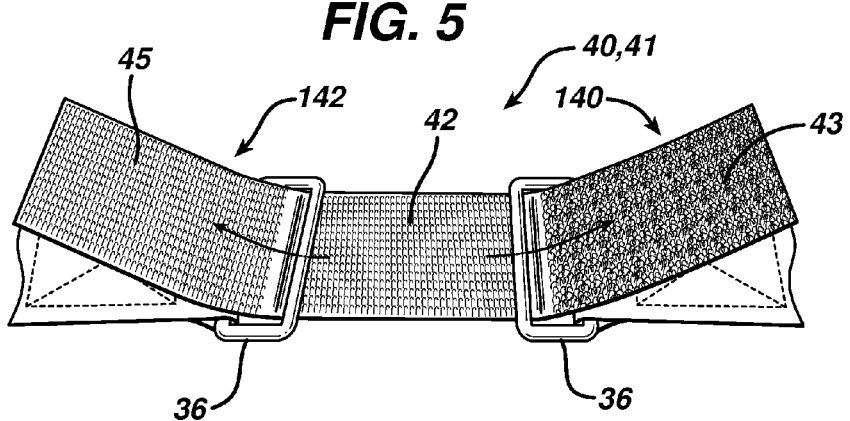
FIG. 5 is a perspective view of the releasable closure used on the horn wrap shown in FIGS. 1-4, in the open position.
Figure 6:
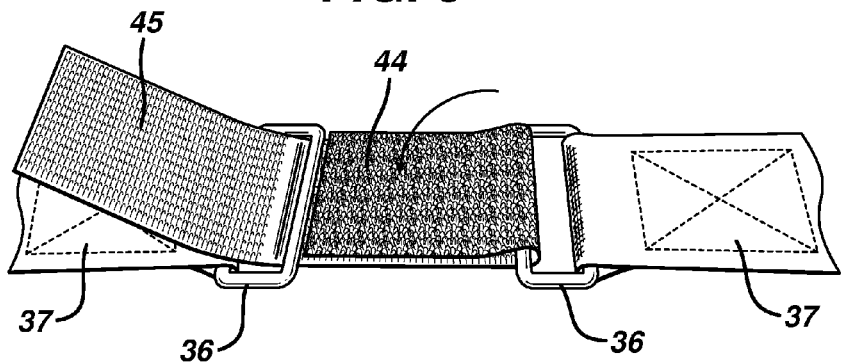
FIG. 6 is a perspective view of the releasable closure with one portion in the closed position.
Figure 7:
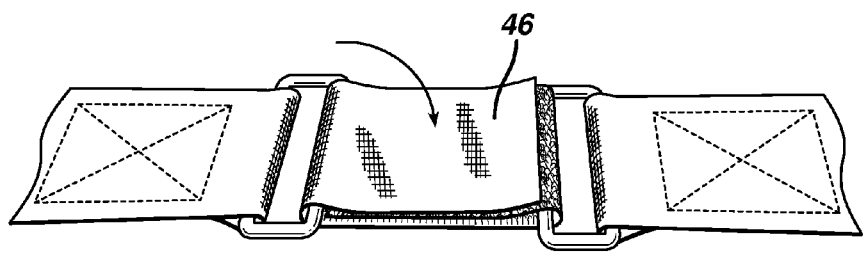
FIG. 7 is a perspective view of the releasable closure with two portions in the closed position.

In the preferred implementation shown in FIGS. 5-7, releasable closures 40, 41 each include a substantially planar elongated band of material having first and second portions. The first portion 140 includes loop fasteners on both of its opposite surfaces 43 and 44. This may be achieved, for example, by attaching two pieces of loop material back-to-back, or by providing a two-sided loop material. The second portion 142, which extends lengthwise from the first portion, includes two side-by-side surfaces 42 and 45, both of which carry hook elements. In preferred implementations the opposite surface 46 of the second portion is free of fastener elements, and may be smooth or may have any desired texture. This configuration allows the releasable closure to be folded in thirds such that when the releasable closure is closed the first portion 140 is captured between the two surfaces 42 and 45 of the second portion, and the generally smooth surface 46 is exposed.

Referring to FIGS. 5 and 6, to initially position the releasable closure 40 on the horn wrap, e.g., when replacing the releasable closure, the releasable closure 40 is looped through the rings 36 and the surface 43 is folded over on to surface 42 (FIG. 6). Preferably, surface 43 includes loop fasteners and surface 42 includes complementary hook fasteners as shown. The interaction of these two surfaces forms a strong releasable bond, which would generally only be disengaged when the releasable closure 40 needs to be replaced due to material deterioration or damage. Leaving the releasable closure in place as shown in FIG. 6 allows quick and easy application and removal of the horn wrap without losing the releasable closure.

Referring to FIGS. 6 and 7, to fasten the horn wrap on an animal the second portion 142 of the releasable closure is threaded through the ring 36 and hook-carrying surface 45 is folded over onto the corresponding loop fasteners on surface 44, capturing the first portion 140 of the releasable closure between surfaces 42 and 45 as discussed above.

The strength of the bond between the first and second portions, and thus the force required to disengage the releasable fastener, can be increased or decreased by altering the amount of interaction between the complementary surfaces 45 and 44. This can be done by the animal's handler, by only partially overlapping the complementary surfaces, or by the manufacturer, e.g., by providing fewer complementary fasteners, less aggressive hook fasteners, or bands of hook fasteners rather than a continuous array of hook fasteners.

In some implementations, the releasable closure 40 utilizes woven nylon hook and loop material measuring from ¾ to 3 inches in width, but preferably e.g. 2 inches in width.

The releasable closures can be easily replaced when worn or damaged. Moreover, the releasable closures can be interchanged with replaceable closures of a different color, e.g., to allow steers to be sorted into different pens, or to indicate something about the steer, for example that it is a "bounty steer" for competition purposes.

OTHER EMBODIMENTS

A number of embodiments have been described. Nevertheless, it will be understood that various modifications may be made without departing from the spirit and scope of the disclosure.

For example, the arrangement of hook and loop fasteners on the releasable closures may be different, e.g., the hooks can be replaced by loops and vice versa.

Moreover, while D-rings and rectangular rings are shown, other types of attachment devices may be used to join the releasable closures and/or the elastomeric strap to the protective members.

Accordingly, other embodiments are within the scope of the following claims.

What is claimed is:
1. A horn wrap comprising:
a pair of protective elements, configured to be positioned on opposite sides of a steer's head, each protective element comprising a side portion which protects the steer's horn and the steer's ears and an opening through which the horn is exposed during use; and an attachment system configured to join the protective elements together around the steer's head, wherein the attachment system comprises a pair of releasable closures that extend between the protective elements and draw the protective elements together around the steer's head, each releasable closure comprising a removable strap that is threaded through corresponding receiving elements on each of the protective elements, the strap including, on one surface, a first portion having hook fasteners and a second portion having loop fasteners, and, on an opposite surface, a portion having loop fasteners, so that the hook fasteners and loop fasteners are engaged by folding the strap in thirds; and wherein the releasable closures are held in place on the protective elements solely by engagement of the hook fasteners with the loop fasteners and are thus removable from the protective elements by a user by simply releasing the hook and loop fasteners.

2. The horn wrap of claim 1, further comprising an elastomeric strap attached to and extending between the protective elements, the elastomeric strap being positioned on the protective elements so that it will extend across the throat of the steer in use.

3. The horn wrap of claim 2, wherein the elastomeric strap comprises a continuous loop of flat elastomeric material.

4. The horn wrap of claim 3, wherein the elastomeric strap comprises a Dally rubber.

5. The horn wrap of claim 1, wherein each protective element further comprises a rear portion, which protects the back of the steer's head and neck, and one of the releasable closures is configured to draw together the side portions, and the other releasable closure is configured to draw together the rear portions.

6. A horn wrap comprising:
a pair of protective elements, configured to be positioned on opposite sides of a steer's head and each comprising a side portion which protects the steer's horn and the steer's ears and defines an opening configured to receive the horn, and a rear portion, which protects the back of the steer's head and neck;

an attachment system configured to join the protective elements together around the steer's head, the attachment system comprising a front releasable closure configured to draw together the side portions, and a rear releasable closure configured to draw together the rear portions, wherein the releasable closures are removable from the protective elements and replaceable by a user, each releasable closure comprising a removable strap that is threaded through corresponding receiving elements on each of the protective elements, the strap including, on one surface, a first portion having hook fasteners and a second portion having loop fasteners, and, on an opposite surface, a portion having loop fasteners, so that the hook fasteners and loop fasteners are engaged by folding the strap in thirds; and an elastomeric strap attached to and extending between the protective elements, the elastomeric strap being positioned on the protective elements to extend across the throat of the steer in use, and configured to break away if caught on a stationary object, preventing entrapment of the steer's head.

7. The horn wrap of claim 6, wherein the elastomeric strap comprises a continuous loop of flat elastomeric material.

8. The horn wrap of claim 7, wherein the elastomeric strap comprises a Dally rubber.

9. The horn wrap of claim 7 wherein the attachment system further comprises rings through which the elastomeric strap can be girth hitched.

10. A method comprising:
placing a first protective element of a horn wrap around one horn of a steer such that the horn extends through an opening in the protective element, the first protective element being secured to a second protective element by an elastomeric strap;

passing the elastomeric strap under the throat of the steer;

stretching the elastomeric strap to position the second protective element over the other horn of the steer;

placing the second protective element around the other horn of the steer; and fastening a pair of removable releasable closures to secure the two protective elements together around the steer's head, each releasable closure comprising a removable strap that is threaded through corresponding receiving elements on each of the protective elements, the strap including, on one surface, a first portion having hook fasteners and a second portion having loop fasteners, and, on an opposite surface, a portion having loop fasteners, so that the hook fasteners and loop fasteners are engaged by folding the strap in thirds.

11. The method of claim 10 wherein each of the releasable closures is partially fastened to one of the protective elements prior to placing the protective element over the steer's horn.

12. The method of claim 10 further comprising, prior to placing the first protective element around one horn of the steer, installing the elastomeric strap by girth hitching it through receiving elements on the protective elements.

13. The method of claim 10 wherein, after fastening the releasable closures, one of the releasable closures is generally aligned with an upper surface of the steer's horns, and the other releasable closure extends across an upper portion of the steer's neck behind the horns.

14. The method of claim 10 further comprising removing the releasable closures from the protective elements and replacing them with new releasable closures.

* * * * *